J. INGELS.
Grain Drill.
No. 105,690.
Patented July 26, 1870.
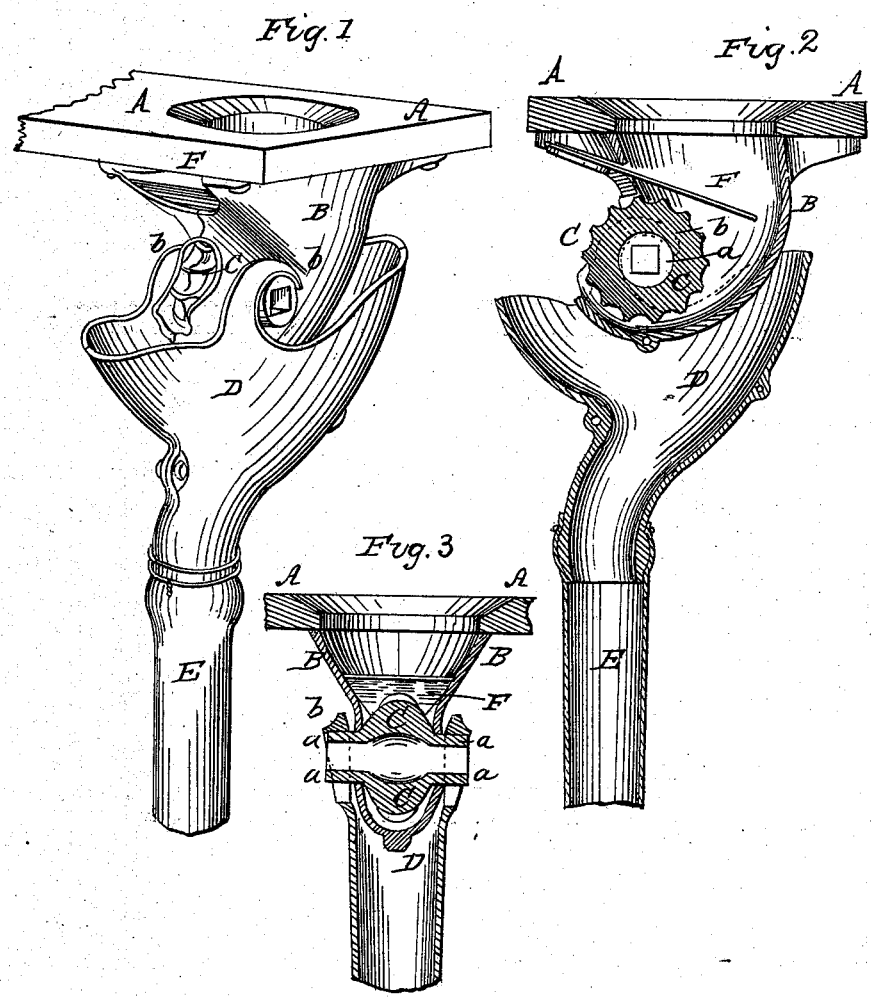

UNITED STATES PATENT OFFICE.

JOSEPH INGELS, OF MILTON, INDIANA.

IMPROVEMENT IN GRAIN-DRILLING MACHINES.

Specification forming part of Letters Patent No. 105,690, dated July 26, 1870.

*To all whom it may concern:*

Be it known that I, JOSEPH INGELS, of Milton, in the county of Wayne and State of Indiana, have invented certain new and useful Improvements in Concaves and Receivers for Grain-Drills; and I do hereby declare the following to be a full, clear, and exact description of the construction and operation of the same, reference being had to the accompanying drawings, making a part of this specification, in which—

Figure 1 represents, in perspective, a portion of the bottom of a seed-hopper, with one of the concaves, receivers, and conducting-tube annexed thereto. Fig. 2 represents a vertical section through the same, taken at right angles to the axis of the seed-wheel. Fig. 3 represents another vertical section, taken in a line parallel to the axis of the seed-wheel.

Similar letters of reference, where they occur in the several separate figures, denote like parts of the apparatus in all of the drawings.

My invention consists in suspending the receivers to their concaves by means of hooks cast on the former and extended hubs upon the seed wheel working in the latter, on or over which hubs or their mechanical equivalent said hooks are passed and held.

To enable others skilled in the art to make and use my invention, I will proceed to describe the same with reference to the drawings.

A may represent the bottom board of any ordinary seed-hopper of a seed-drilling machine, to which the series of seed-conducting devices are attached. B represents one concave of the series, in which a seed-wheel, C, is caused to revolve, and which takes the grain from said concave, and, carrying it out, drops it into a receiver, D, which is suspended to the concave, and from the receiver the grain passes through the tube E, into and through a shoe or hoe, in the usual manner. F is a cut-off, extending downward into the concave and over the seed-wheel C, so as to stop the grain from passing into or through the seeding mechanism when it is desired to have it stopped, and to stop it instantly, while the machine may continue to advance.

I prefer, in casting the seed-wheels C, to form elongated hubs *a a* thereon, which shall extend through the sides of the concave B, and far enough through to admit of hanging the receiver D thereto by means of the hooks *b b*, cast or otherwise formed on said receiver. This allows the receiver to swing upon said hubs freely, as they have a rounded exterior, as seen.

The receivers might just as well be hooked onto the shaft that drives the series of seed-wheels were it not that this shaft is made square or sided, so as to fit a similar opening in cross-area in seed-wheels, and so turn the latter without expensive fitting; and if said shaft be round, then the receivers will work just as well suspended to the shaft as to the hubs *a a*. By inserting a boss or sleeve between the hooks and a square shaft, the boss being round on its exterior and having a square hole through it, or one corresponding in shape to the sectional area of the shaft, so as to turn with the shaft and in the encircling hooks, the swinging motion would be attained.

Having thus fully described my invention, what I claim therein as new, and desire to secure by Letters Patent, is—

In combination with the hooks *b b* on the receiver D, the extended and projecting hubs *a a* on the seed-wheel C, for the purpose of forming a connection between the concave and the receiver of a grain-drilling machine, substantially as described.

JOSEPH INGELS.

Witnesses:
A. B. STOUGHTON,
EDMUND MASSON.